Dec. 5, 1950     T. B. STARNES     2,532,378
WINDSHIELD FOR PLUMB BOBS
Filed March 26, 1948     2 Sheets-Sheet 1
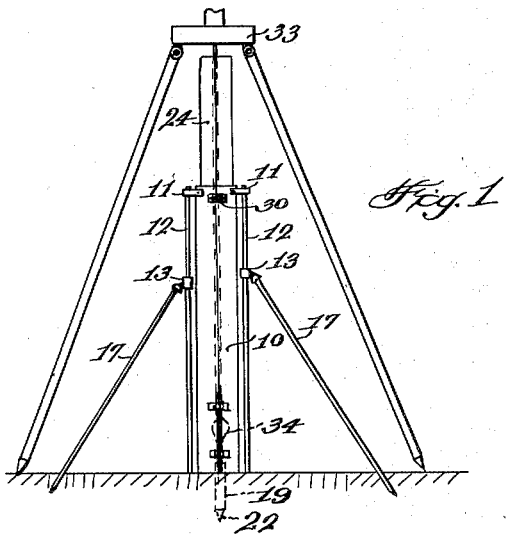
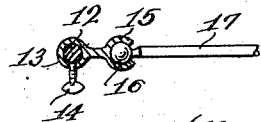
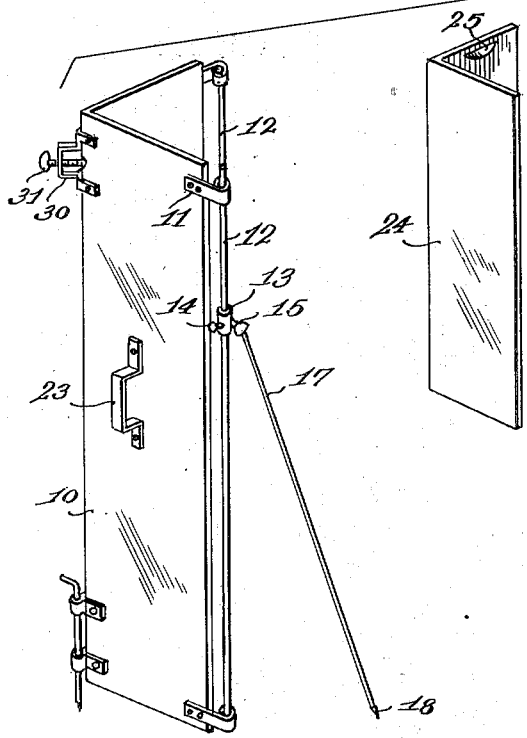
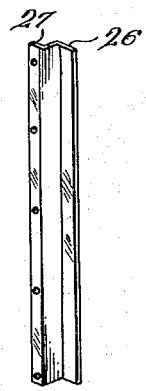
Inventor
*Tilmon B. Starnes*
By *Patrick D. Beavers*
Attorney Dec. 5, 1950 T. B. STARNES 2,532,378
WINDSHIELD FOR PLUMB BOBS
Filed March 26, 1948 2 Sheets-Sheet 2
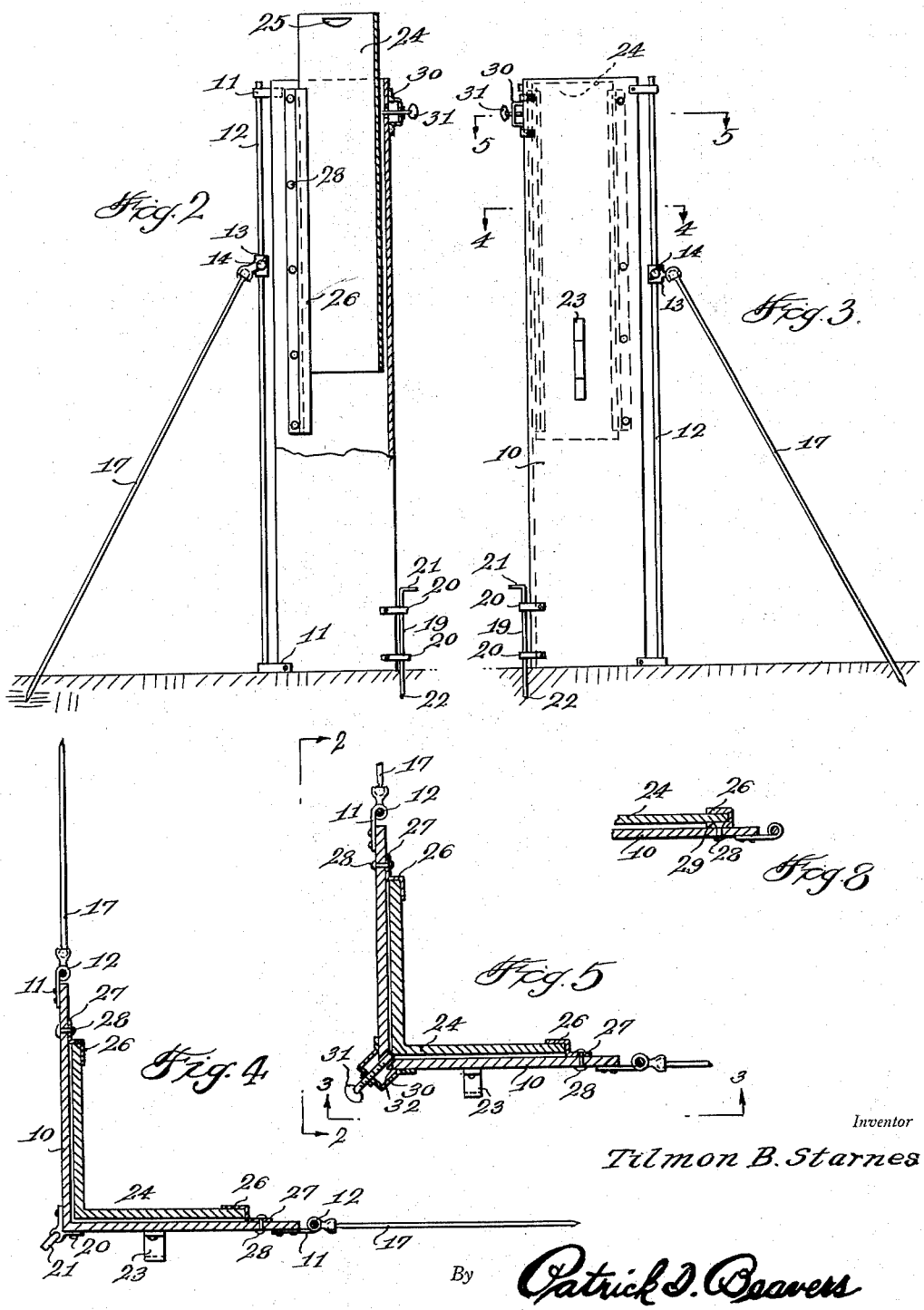
Inventor
*Tilmon B. Starnes*
By *Patrick D. Beavers*
Attorney Patented Dec. 5, 1950

2,532,378

UNITED STATES PATENT OFFICE 2,532,378

WINDSHIELD FOR PLUMB BOBS

Tilmon B. Starnes, Port Arthur, Tex.

Application March 26, 1948, Serial No. 17,339

1 Claim. (Cl. 160—135)

The present invention relates to windshield for plumb bobs and it consists in the combinations, constructions and arrangements of parts herein described and claimed.

It is an object of the present invention to provide a windshield for plumb bobs having means for anchoring the same to the ground.

A further object of the invention is the provision in a device of the character set forth of adjustable bracing rods.

A further object of the invention is the provision of a novel extension shield forming a part of the invention above set forth.

Another object of the invention is the provision of novel guide means for an extension for a windshield for plumb bobs.

A still further object of the invention is the provision of novel means for clamping the extension above referred to in selected positions.

Other and further objects of the invention will become apparent from a reading of the following specification taken in conjunction with the drawings, in which:

Figure 1 is a front elevational view of an embodiment of the invention,

Figure 2 is a side elevational view, partly broken away, taken along line 2—2 of Figure 5 in the direction of the arrows, Figure 3 is a side elevational view taken along line 3—3 of Figure 5 in the direction of the arrows, Figure 4 is an enlarged sectional view taken along line 4—4 of Figure 3, Figure 5 is an enlarged sectional view taken along line 5—5 of Figure 3, Figure 6 is an exploded view in perspective of an embodiment of the invention, Figure 7 is a fragmentary sectional view illustrating certain details of construction, and Figure 8 is a fragmentary sectional view illustrating a modified form of a guide which is a part of the invention.

Generally there is provided a windshield for plumb bobs preferably formed of transparent, non-breakable plastic material and comprising a vertically extending shield generally L-shaped in cross section and provided with an extension shield which is slidably mounted in brackets upon the upper and inner side of the main shield and which may be held in selected positions by means of a thumb screw carried on the outer side of the main shield and extending therethrough to bear against the extension shield. A vertically extending bar is carried by brackets at either side of the main shield and a collar is slidably mounted upon each bar and has pivoted thereto a ground engaging brace rod. The collars are provided with thumb screws for locking the same in selected positions upon the bar. A handle is provided for carrying the apparatus whose use will be hereinafter set forth.

Referring more particularly to the drawings, there is shown therein a windshield for plumb bobs comprising a main shield 10 preferably formed of transparent, non-breakable plastic material and generally L-shaped in cross section. Outwardly extending brackets 11 are mounted adjacent the top and bottom of each of the outer sides of the main shield and support vertically extending rods 12 in spaced relation to the main shield.

Each of the rods 12 is provided with a collar 13 which is slidable thereon and which is provided with a thumb screw 14 for locking the same in selected positions thereon. The collar has formed thereon a socket 15 in which is universally movable a ball 16 formed upon one end of a bracing rod 17 whose free end is pointed, as indicated at 18.

A stake 19 is slidably mounted in brackets 20 carried at the forward end of the main shield and is provided with a head 21 and a pointed lower end 22. A carrying handle 23 is affixed upon the outer side of the main shield 10. Vertically slidable upon the inner and upper side of the main shield 10 is an extension frame 24 having a lifting handle 25 formed therein adjacent its upper end. The extension frame is provided with guideways 26 having outwardly extending feet 27 which are affixed to the main shield 10 by means of rivets 28 or the like.

In a modified form of the invention, as shown in Figure 8, the guideways 26 may be provided with inwardly extending feet 29 which are fastened to the main shield 10 by rivets 28. A substantially U-shaped bracket 30 is mounted adjacent the outer and upper end of the main shield 10 and has threaded therein a thumb screw 31 whose inner end protrudes through an opening 32 in the main shield and is adapted to bear against the extension shield 24.

In operation, it will be apparent that after a transit 33 has been set up and a plumb bob 34 suspended by a plumb line 35 that the apparatus forming the present invention may be placed adjacent the bob in such manner as to shield the same from wind. The stake 19 may then be driven into the ground by pressing upon the head 21. The device may be braced against wind pressure by inserting the bracing rods 17 into the earth and thereafter locking the collars 13 to the rods 12 by means of the thumb screws 14. The extension plate 24 may then be raised upwardly to further and completely protect the plumb bob and its supporting line from the wind and the same may be locked in position by means of the thumb screw 31. When the device is not in use the extension shield may be moved downwardly to entirely fit within the main shield and the rods 17 may be closely aligned with the rods 12 whereupon the entire apparatus may be supported by means of the handle 23.

While but one form of the invention has been shown and described herein, it will be readily apparent to those skilled in the art that many minor modifications may be made without departing from the spirit of the invention or the scope of the appended claim.

What is claimed is:

A device of the character described comprising a transparent main windshield, brackets carried on the upper inner side of said main windshield, a transparent extension windshield vertically slidable in said brackets, means carried at the upper end of the main windshield for locking the extension windshield in selected positions, a vertically extending rod carried in spaced relation at either side of the main windshield, a ground-engaging rod slidably adjustable upon each of said vertical rods and a vertically dependant stake slidably mounted at the lower end of the main windshield.

TILMON B. STARNES.

REFERENCES CITED

The following references are of record in the file of this patent:

UNITED STATES PATENTS

| Number | Name | Date |
| --- | --- | --- |
| 714,794 | Glisson | Dec. 2, 1902 |
| 944,783 | Hadka | Dec. 28, 1909 |
| 1,110,729 | Townsend | Sept. 15, 1914 |